Patented Apr. 7, 1936

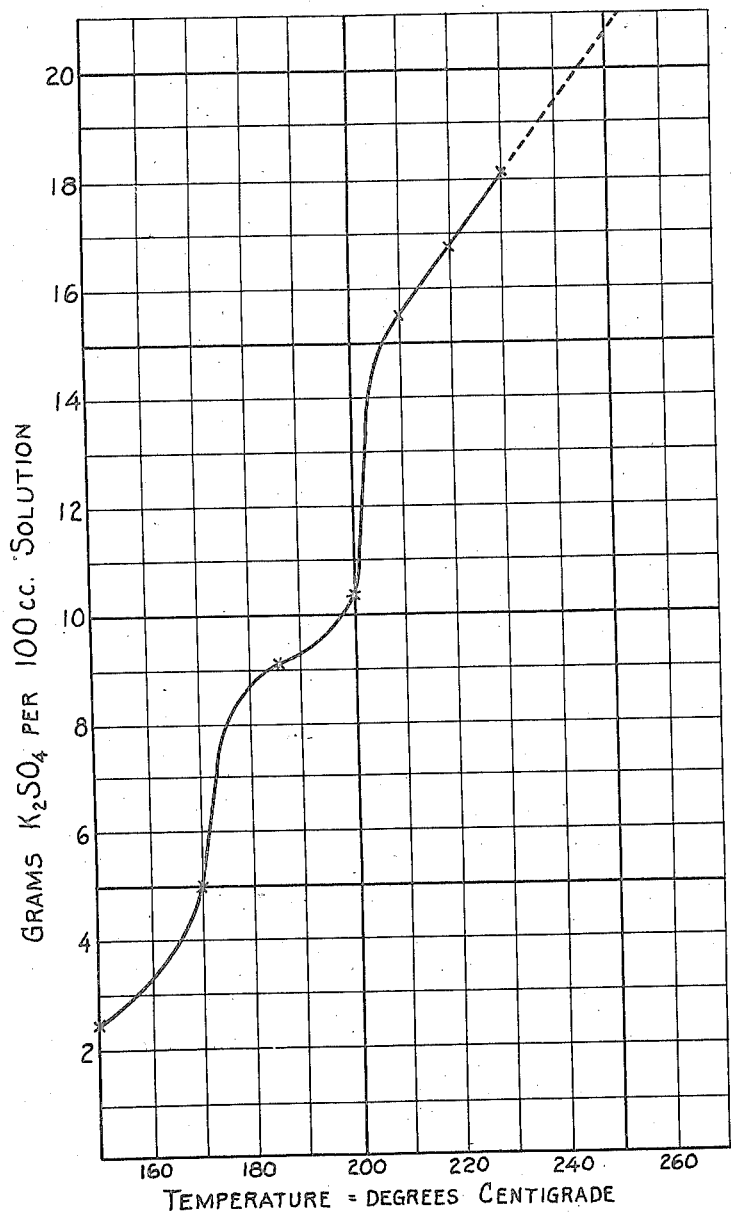

2,036,364

UNITED STATES PATENT OFFICE 2,036,364

PROCESS OF EXTRACTING POTASSIUM SALTS FROM AQUEOUS MIXTURES

Eugene P. Schoch, Austin, Tex.

Application February 17, 1934, Serial No. 711,825

3 Claims. (Cl. 23—40)

This invention relates to the extraction of salts from minerals and more particularly to an improved process for separating potassium sulphate from its compounds or mixtures with calcium sulphate, from which it is otherwise separable with difficulty, whereby all of the potassium sulphate may be withdrawn at temperatures above 170° C. from the solid residues in the form of solutions with concentrations nearer to their equilibrium concentrations at temperatures above 170° C. than is possible by taking such mixtures prepared at ordinary temperatures and heating them at the same high temperatures for substantially the same length of time.

In my U. S. Letters Patent No. 1,952,289 granted March 27, 1934 entitled "Process of extracting salts from minerals," and of which this application constitutes a continuation-in-part, I have disclosed a process of extracting potassium sulphate from its compounds with calcium sulphate, from which it can be extracted only with difficulty, which consists in forming a mixture of the ground compound with water, heating said mixture in a closed vessel for an hour and at a temperature above 200° C., thus rendering the potassium sulphate extractible, and recovering the potassium sulphate.

However, in order to produce solutions with $K_2SO_4$ concentrations above 5–6%, and also to decompose the double salt practically completely, it is necessary to subject the mixture to two or more such heating trials with different initial $K_2SO_4$ concentrations or to subject the solid residue also to extensive leaching operations at temperatures below 100° C. In other words, the systematic attainment of a higher $K_2SO_4$ concentration combined with a practically complete extraction of $K_2SO_4$ from the final residue still requires considerable time and trouble.

As disclosed in my U. S. Letters Patent No. 1,981,125, granted November 20, 1934, entitled "Process of treating polyhalite", such aqueous mixtures of calcium sulphate, potassium sulphate and magnesium hydroxide as are obtained by mixing polyhalite with lime slurry at any temperature below 100° C. ordinarily contain most, if not all, of the potassium present in the form of double salts. Since the magnesium hydroxide in such mixtures is inactive, such mixtures naturally can have the potassium made extractable by the process disclosed in the Patent No. 1,952,289.

Furthermore, in my U. S. Letters Patent No. 1,956,930 granted May 1, 1934, entitled "Process of treating polyhalite with calcium carbonate," I have disclosed a process for extracting potassium sulphate from such mixtures of calcium sulphate and magnesium hydroxide, which process yields a potassium-free solid residue together with a greater concentration of potassium sulphate in solution than is obtainable by means of the process disclosed in Patent No. 1,981,125, namely, heating such mixtures previously made at any temperatures below 100° C. for about the same time and at the same high temperature. While it is evident to any chemist that, with many more hours of heating at the same high temperature, the decomposition of the double sulphates can be made to yield a solution with a concentration much closer to the equilibrium concentration for that temperature, yet the results given in my Patent Number 1,956,930 show that the special process there disclosed yields, at the same temperature in a relatively short time, a potassium-free residue with 9% $K_2SO_4$ solution, which is much nearer to the equilibrium concentration for that temperature than is obtainable by making such mixtures at ordinary temperatures and then heating them to the same high temperatures for substantially the same length of time. Hence I was led to make the effort which has resulted in the discovery of the following general procedure for attaining the same result.

In these decompositions I am fundamentally concerned with the decomposition of pentasalt, which is a compound which has the following composition, $5CaSO_4$, $K_2SO_4$, $H_2O$. The other double salt—syngenite, $CaSO_4$, $K_2SO_4$, $H_2O$,—need not be considered specially because it decomposes very quickly at higher temperatures unless the solutions are fairly concentrated. Thus at 100° C. it decomposes unless the $K_2SO_4$ concentration exceeds 8%, and at 200° C. I found it to decompose in a 15% $K_2SO_4$ solution, and this latter is probably not the limit. However, the $CaSO_4$ set free in its decomposition generally changes immediately to pentasalt, so that the problem of decomposing syngenite really is merely the problem of decomposing the pentasalt which it forms. Many valuable chemical operations are hindered directly or indirectly by pentasalt formation; for instance, the production of $KNO_3$ by reaction between $K_2SO_4$ and $Ca(NO_3)_2$, the production of $KOH$ from $K_2SO_4$ and $Ca(OH)_2$, the production of $Mg(OH)_2$ and of $K_2SO_4$ solution from a mixture of $MgSO_4$ and $K_2SO_4$ by reaction with lime, and many others.

When the materials for any of these reactions are mixed, as usual, under atmospheric pressure, and hence at some temperature from 100° C. downward, they will generally form much syngenite or pentasalt. Hence a large portion of the $K_2SO_4$ is lost and the only known method for its recovery consists of heating the mixture to a temperature above 200° C. to decompose the pentasalt, in accordance with the disclosure in my aforesaid co-pending application.

I have discovered that when the two ingredients of such reaction mixtures are heated separately, each with water, in closed vessels to a certain temperature above 170° C. and are then mixed at that temperature, then an appreciable or extensive formation of pentasalt does not occur. The $CaSO_4$ is obtained in the form of anhydrite and all of the $K_2SO_4$ will be immediately in solution and can be obtained in a concentration much nearer to the equilibrium concentration for any particular temperature than can be obtained by mixing the ingredients and then heating them for an hour or so. The temperature at which the substances are to be mixed depends upon the concentration of the potassium sulphate in the mixture and is given in a table of experimental results presented below.

After cooling the reaction mixture, it can be filtered and washed in the usual manner by which such solids are washed, because the anhydrite requires many hours to form double salts with $K_2SO_4$. The whole operation is much simpler and more rapid than the operation of decomposing pentasalt as proposed in my aforesaid disclosure, and the concentrations of potassium salt obtained can be much higher.

The fundamental facts and considerations which led me to discover this method are as follows: These mixtures present a system of three components ($CaSO_4$, $K_2SO_4$ and $H_2O$) present in four phases (solid $CaSO_4$, solid pentasalt, solution, and vapor). Hence the system has one free variable, and the system can exist throughout a range of temperatures. Thus, to know the equilbrium conditions, I must know the "curve of temperature versus $K_2SO_4$ concentration."

Below 101.5° C. the $CaSO_4$ will be present as gypsum: and up to this temperature the curve of "temperature versus $K_2SO_4$ concentration" for the system composed of gypsum, pentasalt, solution, and vapor is well known. It shows that pentasalt is not decomposable at 100° C. unless the solution produced contains less than 1% $K_2SO_4$.

Above 101.5° C., the calcium sulphate is present as hemihydrate, hence this curve of "temperature versus $K_2SO_4$ concentration" may change direction at 101.5° C. so that, instead of showing a decrease of $K_2SO_4$ concentration with temperature (as it does below 100° C.) it may begin to rise. Beyond 130° C. the hemihydrate, in turn, changes to anhydrite, a change which becomes more rapid as the temperature rises, being fairly rapid at 170° C. and at 205° C. giving the following results:

Gypsum (20.8% $H_2O$), heated for 1 hr. at 205° C. still contained 2.58% $H_2O$; heated for 2 hrs. at 205°, it still contained 1.25% $H_2O$; heated with 2% of lime at 205° for 1 hr., it contained 0.54% $H_2O$.

(Note: I found that lime catalyzes this dehydration.)

It is a well established fact that anhydrite is the only stable form of calcium sulphate above 130° C. and that this delay in dehydration is due to the physical (zeolitic) nature of the hemihydrate crystals. As soon as they are completely dehydrated, the resulting crystals will shrink and form anhydrite crystals of the regular density. Hence it is to be expected that any calcium sulphate formed by chemical reaction at temperatures near 200° C. will be in the form of anhydrite.

Now returning to the consideration of the above curve of "temperature versus $K_2SO_4$ concentration", it it evident that above 170° C. the system contains essentially anhydrite in place of the gypsum present below 100° C.; hence the curve here may have an entirely different direction from what it had below 100° C. As a matter of fact, I found it to show a sharp upward turn; that is, the $K_2SO_4$ concentrations necessary to keep pentasalt intact increase rapidly with temperature.

To determine the course of this "curve of $K_2SO_4$ concentration versus temperature" for the equilibrium between anhydrite, pentasalt, and $K_2SO_4$ solutions, I prepared samples of pentasalt and analyzed them. In general, the samples contained about 15% $K_2SO_4$ and hence their composition was about 75% pentasalt and 25% unconverted gypsum. Portions of about 250 grams of this solid were mixed with about 500 cc. of water, or of a solution containing less $K_2SO_4$ than was expected to be necessary for equilibrium, and the mixture was put into an autoclave which was equipped with a slowly-moving stirrer, and the autoclave and contents heated for several hours to one of the temperatures given in the table below. Samples of the liquid were withdrawn generally at the end of the first, third, fifth, and eighth hour of heating at any one constant temperature. During this operation, the decomposition of pentasalt increased the $K_2SO_4$ concentration of the solution, and the free $CaSO_4$ changed to anhydrite. When, during an interval of three or more hours, no further increase in $K_2SO_4$ concentration was obtained (although a large amount of pentasalt was still present) then the experiment was terminated, and a new trial at another temperature was begun. All of these "approaches" to the end point were thus made by decomposition of pentasalt, but a few were checked by employing the reverse reaction. Since it is mainly important to know those $K_2SO_4$ concentrations below which pentasalt decomposes at an appreciable rate, it is really immaterial whether or not all of the above concentrations are exactly at the point of equilibrium; some of them may be a little smaller.

The results are given in the following table and graphically represented in the diagram forming a part of this specification. No trials were made below 150° C. because the $K_2SO_4$ concentration at lower temperatures is obviously too small to be of value. It is also obvious that the curve will extend upward with temperatures above 230° C. to the limit of experimental possibility.

| C. temp. | Max. concent. of $K_2SO_4$ |
|---|---|
| | Grams per 100 cc. |
| 150° | 2.4 |
| 170° | 5.0 |
| 185° | 9.1 |
| 200° | 10.35 |
| 210° | 15.5 |
| 220° | 16.7 |
| 230° | 18.1 |

Since anhydrite is likely to be the form in which $CaSO_4$ is obtained when it is formed from its ions in aqueous mixtures at temperatures above 170° C., and since this will not react to form pentasalt in those $K_2SO_4$ solutions which are more dilute than those given in the above table for the corresponding temperatures, it is to be expected that pentasalt will not be formed in such solutions by any $CaSO_4$ formed therein by combination of its ions. This expectation has been verified by me with many trials of which the following four are typical.

These trials were made with a cylindrical autoclave of four inches diameter and ten inches height, fitted with a stirrer which made about twenty revolutions per minute. A second cylindrical autoclave, 1½ inches in diameter by ten inches high, was mounted over the lid of the larger one, and connected through this lid with two short ½ inch pipe nipples and a well ground bronze cock. A third, still smaller autoclave, was used when three distinct portions had to be mixed; this was mounted in the same way beside the second autoclave, on top of the lid of the largest autoclave. Each autoclave compartment was equipped with a thermometer well, and the large compartment was also equipped with a pressure gauge.

Experiment 1 (Original No. 209): 14 grams of CaO were slaked, mixed with 520 cc. of water, and placed in the lowest, large autoclave compartment. 100 grams Epsom salt and 40 grams $K_2SO_4$ were dissolved in 200 cc. of hot water, and this solution was poured into the upper autoclave compartment. The charged autoclave was weighed. Then both compartments were heated to 185° C., and the cock between the two was opened, thus allowing the contents of the upper compartment to drop down. The mixture was heated for another 30 minutes. The autoclave was then weighed again to ascertain if it had lost any steam. It was then cooled with water, opened, and its contents filtered while still near 100° C. The solid residue was washed, and finally tested for potassium by boiling it with slightly more sodium carbonate than was necessary to convert all the calcium to $CaCO_3$, and adding cobaltic nitrate solution. Thus potassium was found to be absent.

In this experiment, $CaSO_4$ was formed from $MgSO_4$ plus $Ca(OH)_2$ in the presence of a solution containing 5 grams $K_2SO_4$ per 100 cc. Evidently no pentasalt was formed because the time was entirely too short to decompose pentasalt entirely had any of it been formed. The latter was verified by mixing the same components at ordinary temperatures, and then heating the resulting mixture at 185° C. for the same time; the solid residue was then found to contain 12% $K_2SO_4$ and hence more than half of it was still pentasalt.

Experiment 2 (Original No. 165): The lower compartment was charged with 14 grams CaO slaked in 275 cc. of hot water, while the upper compartment was charged with 100 grams Epsom salt, 40 grams $K_2SO_4$, and 200 cc. of hot water. Both parts were heated to 205° C., and then the cock between the two compartments was opened to allow the upper charge to drop down. Heating at 205° was continued for only five minutes. After proceeding as in Experiment 1, the residue was found to be essentially free from potassium while the solution contained 7.35 grams $K_2SO_4$ per 100 cc. It is evident that no pentasalt was formed because there was insufficient time in which it could have decomposed. Special attention should be called to the fact that no haste was employed to cool, filter and wash the residue, and yet no pentasalt was formed during the latter operation. This was because the solid was in the form of anhydrite, and this does not react readily with $K_2SO_4$ solutions near 100° C.; contact for many hours is necessary for such reaction.

Experiment 3 (Original No. 169): The lower compartment of the autoclave was charged with 75 grams $K_2SO_4$ dissolved in 420 cc. of hot water. The upper compartment was charged with 100 grams of $Ca(NO_3)_2$, $4H_2O$, dissolved in 200 cc. of water plus a pinch of lime to prevent corrosion. Both compartments were heated to 210° C., then the cock was opened, and the upper solution allowed to drop down. The mixture was heated only five minutes longer (at 210° C.). After proceeding as in Experiment 1, the residue was found to contain only 0.84 grams $K_2SO_4$ even though the solution in contact with it contained right after mixing 11 grams $K_2SO_4$ per 100 cc. Here is illustrated the formation of $KNO_3$ at a relatively low temperature with a very short reaction period, and a fairly high concentration of potassium sulphate at the beginning.

Experiment 4 (Original No. 371): In this experiment a three chambered combined autoclave was used, as hereinbefore mentioned. The lower compartment was charged with 18.7 grams CaO slaked hot in 300 cc. $H_2O$. The larger of the two upper compartments was charged with 200 grams of polyhalite (ground to pass 100 mesh) and 175 cc. $H_2O$. The smaller of the two upper compartments was charged with 37.5 grams $K_2SO_4$ dissolved in 193 cc. of hot water.

The lower compartment and the small upper compartment were heated to 220° C. and the cock therebetween was opened to allow the charge to drop down and mix with the lime. At these high temperatures lime and $K_2SO_4$ react only to the extent of forming a 0.11 normal solution of KOH, but under these conditions the anhydrite formed by this reaction forms no pentasalt (as is shown by the result stated below) while at lower temperatures (below 170° C.) it would form pentasalt.

Next the whole apparatus was cooled and the small upper compartment was charged with five grams CaO slaked in 30 cc. of hot water. Then the whole apparatus was weighed and the lower compartment reheated to 220° C., and then the bronze cock at the bottom of the large upper compartment was opened. The mixture in the latter was too thick to be heated direct, so I allowed the steam from below to heat it by condensation so that it was slowly washed down into the lower compartment. As soon as a tap of a hammer on the large upper compartment revealed that the polyhalite had been washed down, then the bronze cock at the bottom of the small upper compartment was opened to allow the small lime charge therein to drop down into the lower part. Finally the lower part of the autoclave was heated twenty minutes longer at 220° C. The rest of the procedure was as before; the whole apparatus was weighed again: it weighed 35 grams less than before, due to loss of steam by leakage. The apparatus was cooled with water, opened, and the liquid filtered and tested; it contained 13 grams $K_2SO_4$ per 100 cc. The $K_2SO_4$ found in the washed solid residue amounted to only ⅓ of 1% of the weight of the polyhalite taken.

When the same ingredients were mixed at ordinary temperatures and then heated in this autoclave to 220° C. and maintained at that temperature for 1 hr. more, then the washed solid residue was found to contain an amount of $K_2SO_4$ equal to 10% of the weight of the original polyhalite. Of course if with the latter procedure the quantity of water employed is great enough to produce a final $K_2SO_4$ concentration of only 8 or 9 grams per 100 cc., then the amount of $K_2SO_4$ retained by the solid will be only 3 to 4 per cent of the weight of the polyhalite used and most of this may finally be removed by a systematic, though extensive, leaching procedure. But this shows the advantages of the new procedure, here disclosed, as compared with the procedure disclosed in my aforesaid co-pending application; the new procedure yields a solution of a higher $K_2SO_4$ concentration, it does this in less time, and finally it yields a residue practically free from $K_2SO_4$ and which hence does not require the additional leaching procedure or extra heating under pressure which the preceding method still required.

In this experimental mixture, besides the molecules of $CaSO_4$ formed by combination of the Ca ion from the lime and the $SO_4$ ion from the $MgSO_4$ (and from part of the $K_2SO_4$), there are introduced into the mixture the molecules of $CaSO_4$ which were contained in the original polyhalite molecules. These $CaSO_4$ molecules are here liberated under conditions which favor the formation of anhydrite, and since anhydrite does not form pentasalt under these conditions, it was to be expected that this $CaSO_4$ released from polyhalite also would not form pentasalt. The experimental results obtained confirmed this expectation.

It is obvious that those skilled in the art may vary the steps and combinations of steps constituting the hereinbefore disclosed method within the scope of this invention without departing from the spirit thereof, and therefore it is not desired to be limited strictly by the foregoing except as may be required by the claims.

What is claimed is:

1. The process of forming anhydrite from its ions in aqueous mixtures which also contain potassium ions which comprises heating separately under pressure the portion containing the calcium ion and the portion containing the sulphate ion and the potassium ion, and mixing these portions for reaction at temperatures above 170° C. under conditions to form anhydrite in substantial amount and thereby materially reduce the formation of pentasalt.

2. The process of forming anhydrite by reaction of potassium sulphate with a calcium salt, which process comprises heating separately under pressure an aqueous mixture of the potassium sulphate and an aqueous mixture of the calcium salt, and mixing these portions for reaction at temperatures above 170° C. under conditions to form anhydrite in substantial amount, and thereby materially reduce the formation of pentasalt.

3. The process of decomposing polyhalite while forming anhydrite and other salts, which process comprises heating a mixture of water and lime, separately heating an amount of polyhalite slurry containing an amount of magnesium sulphate not exceeding the equivalent of the lime present in the first mixture, and mixing the separately heated portions for reaction at temperatures above 170° C. under conditions to form anhydrite in substantial amount and thereby materially reduce the formation of pentasalt.

EUGENE P. SCHOCH.